(12) United States Patent
Lorenz et al.

(10) Patent No.: US 12,038,335 B2
(45) Date of Patent: Jul. 16, 2024

(54) SENSOR ARRANGEMENT HAVING A TEMPERATURE SENSOR ELEMENT AND METHOD FOR ITS PRODUCTION

(71) Applicant: First Sensor Mobility GmbH, Dresden (DE)

(72) Inventors: Daniel Lorenz, Dresden (DE); Lars Petersen, Dresden (DE)

(73) Assignee: First Sensor Mobility GmbH, Dresden (DE)

( * ) Notice: Subject to any disclaimer, the term of this patent is extended or adjusted under 35 U.S.C. 154(b) by 372 days.

(21) Appl. No.: 17/405,428

(22) Filed: Aug. 18, 2021

(65) Prior Publication Data

US 2021/0381909 A1 Dec. 9, 2021

Related U.S. Application Data

(63) Continuation of application No. PCT/DE2020/100216, filed on Mar. 18, 2020.

(30) Foreign Application Priority Data

Mar. 18, 2019 (DE) .................... 10 2019 106 815.0

(51) Int. Cl.
*G01K 13/02* (2021.01)
*G01L 19/00* (2006.01)

(52) U.S. Cl.
CPC .......... *G01K 13/02* (2013.01); *G01L 19/0092* (2013.01)

(58) Field of Classification Search
None
See application file for complete search history.

(56) References Cited

U.S. PATENT DOCUMENTS

| 4,246,787 | A | * | 1/1981 | Harper | ..................... G01K 1/18 |
| | | | | | 374/185 |
| 7,641,388 | B2 | * | 1/2010 | Hayashi | .............. G01L 19/0092 |
| | | | | | 374/148 |
| 9,606,010 | B2 | | 3/2017 | Kaiser et al. | |

(Continued)

FOREIGN PATENT DOCUMENTS

| DE | 10 2007 015196 A1 | 10/2007 |
| EP | 1 039 281 A1 | 9/2000 |
| EP | 2 075 559 A2 | 7/2009 |

OTHER PUBLICATIONS

PCT Written Opinion and Search Report, dated Jun. 19, 2020, 10 pages.

(Continued)

*Primary Examiner* — Brandi N Hopkins
*Assistant Examiner* — Nigel H Plumb
(74) *Attorney, Agent, or Firm* — Barley Snyder

(57) ABSTRACT

A sensor arrangement includes a temperature sensor element, a connection device electrically connecting the sensor arrangement to an external device, a plurality of electrical lines electrically connecting the temperature sensor element to the connection device, a carrier holding the temperature sensor element and the electrical lines, and an encasing enclosing the temperature sensor element. The carrier has a measuring portion. The electrical lines are arranged directly on the carrier or on a separate line carrier arranged on the carrier. The electrical lines have a cross-sectional area equal to or less than 0.08 mm$^2$.

18 Claims, 3 Drawing Sheets

(56) References Cited

U.S. PATENT DOCUMENTS

2007/0237205 A1\* 10/2007 Hayashi .............. G01L 19/0007
374/E13.006
2009/0168838 A1\* 7/2009 Harr ....................... G01K 13/20
374/163

OTHER PUBLICATIONS

Communication from the Examining Division and Annex to the Communication dated Feb. 5, 2024, 5 pages.

\* cited by examiner

SENSOR ARRANGEMENT HAVING A TEMPERATURE SENSOR ELEMENT AND METHOD FOR ITS PRODUCTION

CROSS-REFERENCE TO RELATED APPLICATIONS

This application is a continuation of PCT International Application No. PCT/DE2020/100216, filed on Mar. 18, 2020, which claims priority under 35 U.S.C. § 119 to German Patent Application No. 102019106815.0, filed on Mar. 18, 2019.

FIELD OF THE INVENTION

The present invention relates to a sensor arrangement and, more particularly, to a sensor arrangement having a temperature sensor element.

BACKGROUND

Sensor arrangements can comprise at least one temperature sensor element which is arranged, for example, on a printed circuit board, and a connection device for tapping the electrical measurement signals of the sensor arrangement and forwarding them to an external device for evaluating and/or using the measurement results. Such a connection device can be, for example, one or more plug contacts, contact surfaces, or another electronic component for the wired or wireless connection of the sensor arrangement to the external device.

The sensor arrangement further comprises electrical lines that connect the temperature sensor element to the connection device. These represent an electrical connection between the temperature sensor element and the connection device, but also a thermal connection between the temperature sensor element and other components of the sensor arrangement.

To protect the sensor element, at least the sensor element and the printed circuit board are encased. The encasing material has a thermal conductivity which is adapted to the respective temperature ranges to be measured and the medium which surrounds the encased temperature sensor element.

A temperature sensor element can have a board that can comprise the electronic components and structures required for this purpose for operating the sensor arrangement, for receiving and processing the measurement signals to the desired extent, and for forwarding the output signals. Alternatively, these functions can be implemented on the printed circuit board of the temperature sensor element or can be taken over by a board of another component, for example another sensor, to which the temperature sensor element is connected.

Temperature sensor elements differ among other things in the measuring ranges they cover, the measuring accuracy, the reproducibility and tolerances of the measuring results, and the response time. The latter is a measure of the time which a temperature sensor element needs until it has adjusted itself to a temperature after a temperature change which deviates from the new temperature value by a predeterminable temperature difference. For example, a t90 value is a measure of the time which the temperature sensor element needs after a temperature change in order to reach the value that results from the initial value plus 90% of the positive or negative temperature change. The response time is influenced, among other things, by the components of the sensor arrangement that are thermally connected to the temperature sensor element.

Depending on the temperature profile, it can be advantageous for the temperature sensor element to have a short response time in order to promptly indicate temperature changes. Or it can have a long response time in order to calm down and smooth the measurement process. The response times must be tailored to the ambient conditions for the application in question, as the time actually to be expected for the respective temperature equalization depends significantly on the surrounding medium and other parameters, such as a possible flow in the medium or other.

The essential components of a pressure sensor include a housing with a pressure opening on which the medium is applied, the pressure of which is to be measured. The known pressure sensors regularly have a pressure opening in the housing or a pressure port projecting into the housing with a pressure channel running through the pressure port. The pressure opening or the pressure channel is closed on one side with a micromechanical pressure transducer (sensor chip) arranged in the housing, so that a medium, the pressure of which is to be measured, acts directly on the pressure transducer through the open side of the pressure opening or the pressure channel and an electrical output from the pressure transducer signal is a measure of the applied pressure.

For this purpose, the pressure sensor can be placed in the medium or arranged with the open side of the pressure opening or pressure channel on or in an opening of a container wall which encloses the medium.

Furthermore, the pressure sensor regularly comprises an integrated circuit which is integrated on a board and can be used for signal processing, signal transmission and, if necessary, further functions of the pressure sensor.

The pressure sensor is often combined with a temperature sensor element, for example in order to determine the temperature in the medium whose pressure is to be measured. The pressure signal can also be temperature-compensated by an integrated temperature sensor element.

SUMMARY

A sensor arrangement includes a temperature sensor element, a connection device electrically connecting the sensor arrangement to an external device, a plurality of electrical lines electrically connecting the temperature sensor element to the connection device, a carrier holding the temperature sensor element and the electrical lines, and an encasing enclosing the temperature sensor element. The carrier has a measuring portion. The electrical lines are arranged directly on the carrier or on a separate line carrier arranged on the carrier. The electrical lines have a cross-sectional area equal to or less than 0.08 mm$^2$.

BRIEF DESCRIPTION OF THE DRAWINGS

The invention will now be described by way of example with reference to the accompanying Figures, of which.

DETAILED DESCRIPTION OF THE EMBODIMENT(S)

The invention is below using an embodiment, but not in a limiting manner. The accompanying drawings show the device only to the extent necessary to explain the invention. A person skilled in the art would further combine the features described herein in further embodiments insofar as it appears expedient and sensible to such person.

Figure 1:
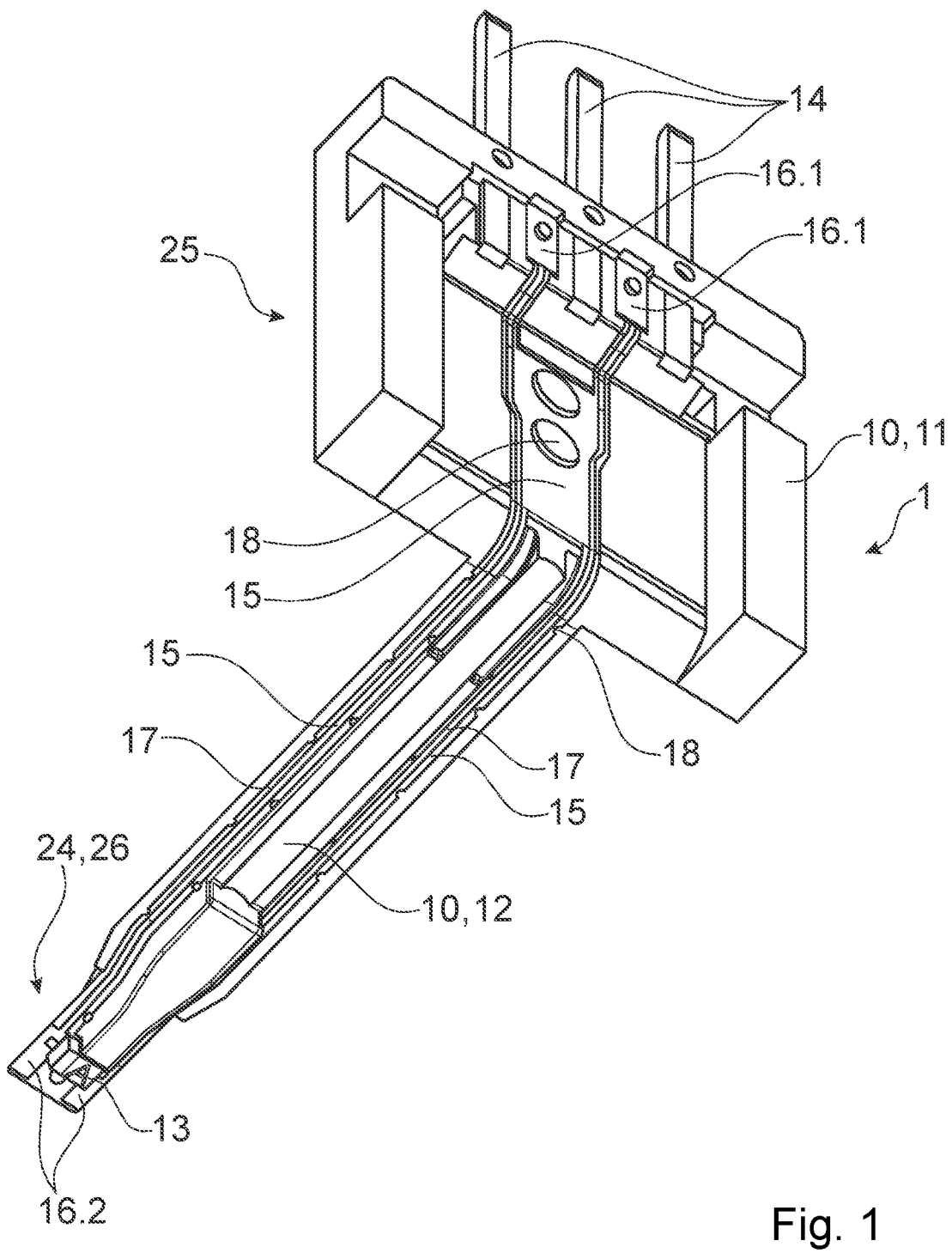
FIG. 1 is a perspective view of a sensor arrangement according to an embodiment.

FIG. 1 shows a sensor arrangement 1 in which a temperature sensor element 13 is a printed circuit board 15, designed with flexible and rigid portions. The sensor arrangement 1 includes a carrier 10 used to hold the temperature sensor element 13. As shown in FIG. 1, the angled carrier 10 of the sensor arrangement 1 comprises a carrier plate 11 and a carrier arm 12; both are at right angles to each other.

In the embodiment shown in FIG. 1, a free end of the carrier plate 11 has three plug contacts which serve as connection devices 14 connecting the temperature sensor element 13 to an external device and, for this purpose, can be connected to a board. The connection devices 14, which are suitable for transmitting output signals from the temperature sensor element 13 to the external device, can be, for example, plug-in contacts, flexible contacts or other contacts. Transmission devices for wireless transmission of the output signals are also possible. The connection devices 14 can be arranged on the carrier 10 in a connection portion 25, alternatively also on a further component which is part of the sensor arrangement 1 or of another device in which the temperature sensor element 13 is integrated.

The connection devices 14 are used to transmit the measured signals and to operate the sensor arrangement 1 by suitable external devices. The latter are adapted to the respective application of the sensor arrangement and are not part of the sensor arrangement 1.

Two first contact surfaces 16.1 are arranged between the plug contacts 14 embodying the connection devices 14 in FIG. 1. This portion of the carrier 10 represents the connection portion 25 of the carrier 10.

A temperature sensor element 13 is arranged at the free end of the carrier arm 12 opposite the connection portion 25, as shown in FIG. 1. A measuring portion 24 is formed at one end of the carrier 10; the area of the carrier 10 on which the temperature sensor element 13 can be arranged is referred to as the measuring portion 24. The measuring portion 24 can be a free end of the carrier 10, wherein the base area of the measuring portion 24 corresponds to the area required to mount and contact the temperature sensor element 13, alternatively with or without a printed circuit board and optionally with separate contact areas. The response time of the temperature sensor element 13 can be reduced by such a minimized base area.

The temperature sensor element 13 be mounted on a printed circuit board 15 or directly on the carrier 10. The printed circuit board 13 or the temperature sensor element 13 itself can have electronic components which are suitable for operating the temperature sensor element 13. This includes, for example, the control of the measurement sequences, the forwarding and optionally also an intermediate storage and/or a first processing of the measurement signals and other things. Such electronic components can alternatively or additionally be arranged on a board that can belong to the temperature sensor element 13 or to another device, for example a pressure sensor 2, which is combined with the temperature sensor element 13 in the sensor arrangement 1, for example integrated in the temperature sensor element 13.

The temperature sensor element 13 is electrically connected to two second contact surfaces 16.2, which can be arranged to the side of the temperature sensor element 13, for example.

Figure 2:
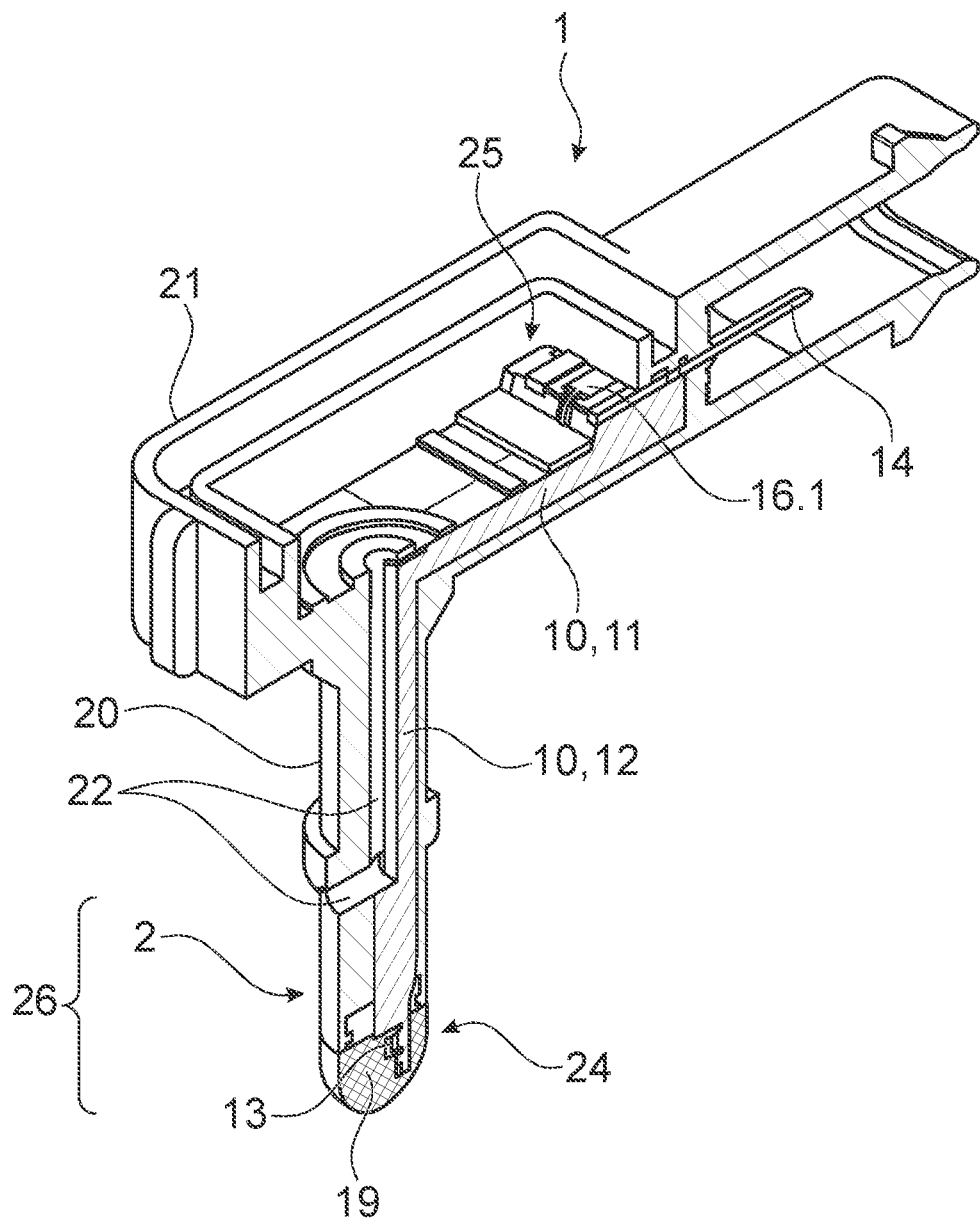
FIG. 2 is a sectional perspective view of a pressure-temperature sensor according to an embodiment including the sensor arrangement.
Figure 3:
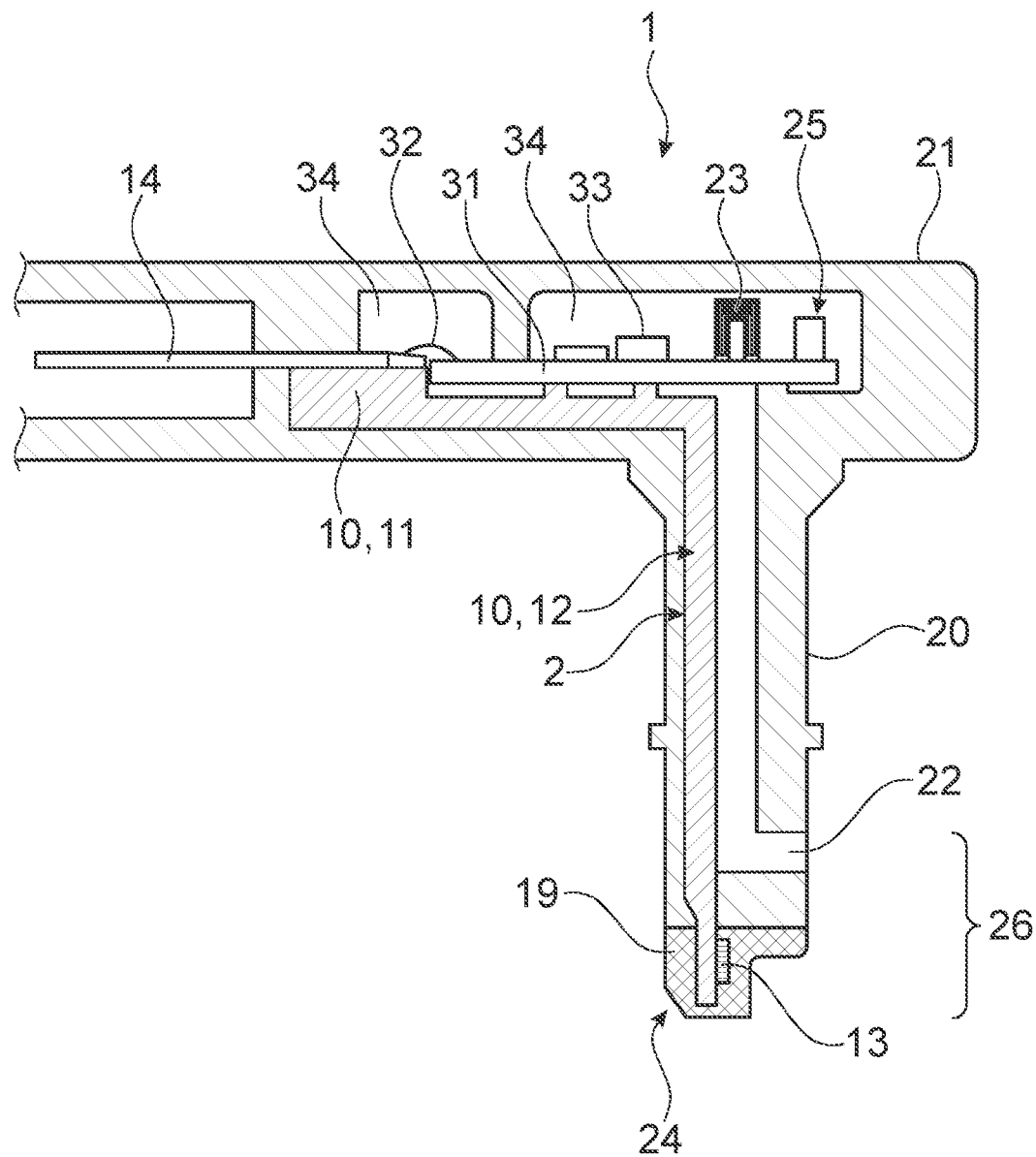
FIG. 3 is a sectional side view of a pressure-temperature sensor according to another embodiment including the sensor arrangement.

The temperature sensor element 13, the second contact surfaces 16.2, and the free end of the carrier arm 12 can be enclosed by an encasing 19, as shown in FIGS. 2 and 3. This encasing 19 is directly exposed to the medium to be measured and is used for physical and chemical protection of the temperature sensor element 13. The encasing 19 also has the task of transferring heat between the medium and the temperature sensor element 13. The encasing 19 can adjoin the carrier 10 or at least also enclose portions of it, such as the measuring portion 24. The encasing 19 protects the sensor arrangement 1 from external stress. The encasing 19 leaves at least the sensor signal inputs of the sensor elements integrated in the sensor arrangement 1, also referred to here as the measuring head 26 of the sensor arrangement 1, free, in particular the enclosed temperature sensor element 13.

The first and/or second contact surfaces 16.1, 16.2 are each formed on a rigid portion of a partially flexible printed circuit board 15 of the sensor arrangement 1 in the embodiment shown in FIG. 1. This extends from the first contact surfaces 16.1 to the second contact surfaces 16.2 and is flexible at least in portions in the region between the first and the second contact surfaces 16.1, 16.2. The printed circuit board 15 has electrical lines 17. Alternatively, the contact surfaces 16.1, 16.2 can be formed separately and connected to the electrical conductors 17. The electrical lines 17 extend on the surface of the carrier 10 from in each case a first contact surface 16.1 to a second contact surface 16.2. The circuit board 15 is mechanically fixed to the carrier plate 11 and to the carrier arm 12 by a plurality of holding elements 18.

The position of the circuit board 15 in the region of the first and/or the second contact surfaces 16.1, 16.2 is fixed on the carrier 10 by a plurality of fixing elements. A sectionwise or completely circumferential border of these regions of the printed circuit board 15 which overlap the plate 11 in the edge region, for example, can be used as a fixing element. As an alternative or in addition, the printed circuit board 15 can have toothing elements arranged circumferentially or in the surface, which are in operative connection with the carrier 10.

The use of a printed circuit board 15 with a reinforced plate 11 in the regions of the first and/or second contact surfaces 16.1, 16.2 allows a wire bond to be made on the contact surfaces 16.1, 16.2 to connect the electrical lines 17 to the temperature sensor element 13 and/or to the connection devices 14, for example by thermosonic ball wedge bonding or ultrasonic wedge-wedge bonding or other suitable methods.

The electrical lines 17 of the sensor arrangement 1 are to be distinguished from the lines and line structures of the temperature sensor element 13. The latter can be completely enclosed in the encasing 19 of the temperature sensor element 13 and are only used to connect the temperature sensor element 13 to the printed circuit board 15 and/or to electronic components on the circuit board 15 and/or to the electrical lines 17. The electrical lines 17 for connecting the temperature sensor element 13 to the connection devices 14 regularly overcome larger distances and, as a result, are exposed to greater mechanical stress than the lines and line structures of the temperature sensor element 13. The electrical lines 17 can be made in one or more parts as a function of various parameters determined by the application, such as the design of the sensor arrangement 1, the distance to be overcome with the electrical lines 17, the expected mechanical stress, and others.

The electrical lines 17 connect the temperature sensor element 13, if necessary via a printed circuit board 15 on which the temperature sensor element 13 is mounted, to the connection devices 14. In addition to the electrical connection, they also represent a thermal connection to a distant region, the temperature of which deviates from the temperature in the vicinity of the measuring portion 24, hereinafter also referred to as the measuring environment, by a significant amount for the respective measuring range and the required measuring accuracy.

For thermal decoupling of the temperature sensor element 13 from the temperature of the distant region, the electrical lines 17 are very thin, for example they have a cross section with areas equal to or less than 0.08 $mm^2$, equal to or less than 0.05 $mm^2$, equal to or less than 0.025 $mm^2$, equal to or less than 0.01 $mm^2$, or equal to or less than 0.005 $mm^2$. With advancing technical development, these values can also be fallen below. The lines 17 can have a round or square or otherwise shaped cross-section.

The electrical lines 17 used in the specified thicknesses can be designed in various ways in order to make the lines 17 manageable and inexpensive to manufacture, as well as reliable in the long term, despite their small cross-section. The electrical lines 17 are arranged directly on the carrier 10 or on a line carrier and, by this, on the carrier 10. Such an arrangement offers the mechanical stabilization required for the aforementioned small line cross-sections and also the possibility that the electrical lines 17 follow the shape of the carrier 10, its surface topography, at least in portions, and in an embodiment along the entire carrier. The carrier 10 also acts as protection for the electrical lines 17. It is not necessary to protect the individual line. With the methods described below, the possibilities for producing the electrical line 17 are multiplied and the formation of complex and variable line routing becomes possible.

In a first embodiment, at least the electrical lines 17 are produced directly on the carrier 10, optionally on a separate line carrier, which is connected to the carrier 10, by LDS (laser direct structuring). The carrier 10 produced LDS is designed as a MID (Molded Interconnect Devices or Mechatronic Integrated Devices), i.e. it has a spatially integrated electrical circuit carrier in which mechanical, electronic, and other functions are integrated in one component, the carrier 10 or the separate line carrier, and thus 3-dimensional component geometries are possible. LDS technology is known and has hitherto been used, for example, to integrate electronic functions, in particular electrical lines, directly into or on components of almost any shape. In addition to plastics, these components can be made of glass, ceramics or specially coated metals. In LDS, a thermoplastic material is used to produce the carrier 10, which is doped with a non-conductive, laser-activated metal compound. The line 17 structures are produced by a laser and subsequent metallization of the laser path on the surface of the carrier 10. With subtractive laser structuring, the electrical lines 17 are introduced into a metallized surface of the carrier 10 by of structured etching resist and etching.

Various techniques are available for the production of lines 17 or components, such as additive or subtractive laser direct structuring, two-component injection molding, hot stamping, film insert molding, the mask exposure process, direct circuit trace writing or others.

In two-component injection molding, a pre-molded part of the carrier 10 is produced, on which the electrical lines 17 are subsequently produced with the desired course by a second injection molding step. In a further alternative method, the electrical lines 17 are printed on the carrier 10 or on a line carrier by hot stamping.

Alternatively, the carrier 10 or a line carrier with the electrical lines 17 can be produced by film back injection molding. In this process, the lines 17 that are present on a carrier film are transferred from the carrier film to the injection-molded part, here the carrier 10 or the line carrier, as a result of the heat during injection molding.

Alternatively, the electrical lines 17 can be formed on an at least partially flexible printed circuit 15 board using the known methods for producing printed circuit boards and conductor tracks. In the flexible portions of the printed circuit board 15, the electrically insulating carrier material and the conductor tracks located on it are formed flexibly, so that the electrical lines 17 in these portions can follow changes in direction of the surface of the carrier 10. If portions of the conductor track are permanently or temporarily exposed to, for example, mechanical or thermal stress, these portions can also be designed to be rigid. Portions with increased mechanical stress are, for example, those in which contact surfaces for establishing the connection with the connection devices 14 are arranged. Alternatively, the entire line carrier can also be designed to be flexible.

MIDs can comprise electrical lines 17 that are executed directly on the carrier 10 or on a line carrier of any shape, following the surface topography and with suitable, also very free and differentiated line routing, which, for example, supports the said thermal separation of the temperature sensor element 13. In addition, components, for example contact surfaces, can also be formed in the measuring portion 24 and/or in the connection portion. These can be used to connect the electrical lines 17 to the temperature sensor element 13 and/or to the connection devices 14. Other electronic components can also be added using LDS.

Optical, thermal, fluidic, and mechanical functions that support the mechanical stability, the sensor function and/or its thermal separation from the other components of the temperature sensor element 13 and/or that device in which the temperature sensor element 13 is integrated can also be supplemented by LDS.

In an alternative embodiment, the electrical lines 17 can be formed by the flexible printed circuit board 15. In this case, the electrical lines 17 are formed on the printed circuit board 15, which is flexible and can be fixed on the surface of the carrier 10, the structure of which it follows. In this case too, the electrical lines 17 are protected from undesired mechanical stress and can be used in the desired thickness. Furthermore, as described above for the MID, additional electronic components and/or additional functions can be integrated on the flexible printed circuit board 15.

Another embodiment uses a printed circuit board 15 which is only flexible in portions and otherwise rigid. In this case, portions of such a printed circuit board 15, which are subject to higher demands in terms of stability, are reinforced by a rigid plate. Such a printed circuit board 15 has flexible portions and rigid portions of a composite of flexible printed circuit board and reinforcement plate. The bonding of electrical lines 17 to bond pads, for example, requires such a higher stability, since both the bonding itself and the tests of bond connections can stress the circuit board 15 mechanically in such a way that a flex circuit board 15 would not withstand or at least be warped. For this reason, the portions of the bond pads can be reinforced. Other highly stressed portions can also be reinforced in this way.

The assembly of a line carrier of the MID design or the completely or partially flexible printed circuit board 15 on the carrier 10 can be carried out by hot or cold glue, by mechanical fixing, or in another suitable manner.

Another embodiment of the electrical lines 17 is their formation as a leadframe. Leadframes can be manufactured in the desired small thickness and with a complex design at low production cost. The leadframe comprises the contact surfaces required for the temperature sensor element 13 and for the connection devices 14 and is mounted on the carrier 10. The leadframe also improves the mechanical stability of the thin electrical lines 17 used.

A three-dimensional, integrated line or circuit carrier, depending on the equipment of the carrier 10, is produced, which carries, protects the described thin electrical lines 17, and can be implemented with a very variable design that can be adapted to different applications and configurations of the sensor arrangement 1. In addition, the carrier 10 with a line carrier can be produced as a composite component, the components of which, carrier 10 and line carrier, have little or no differences in thermal expansion behavior, whereby the reliability can be improved even under harsh application conditions.

The combination of the thermal decoupling of the temperature sensor element 13 by thin electrical lines 17 and poorly temperature-conducting carrier 10 with the good heat conduction and heat transfer of the encasing 19 enables a short response time of the temperature sensor element 13, wherein the suitable materials and their thermal properties depend on various parameters. These include the temperature measuring range, the cross-section of the carrier 10 at least in those portions in which the heat conduction to the temperature sensor element 13 is to be reduced, the design and thickness of the encasing 19, the medium surrounding the temperature sensor element 13, and others. In addition to the thermal decoupling, a factor that must also be taken into account for unadulterated temperature measurements is low self-heating of the sensor element 13 itself. This can be reduced by using suitable electronic components, as set out below.

By way of example, but not by way of limitation, the carrier 10 can consist of a plastic which, at least in the measuring portion 24 and the portions directly adjoining it, has a thermal conductivity of $5*10\text{-}6\ m^2/s$ or less, $2.5*10\text{-}6\ m^2/s$ or less, $10\text{-}6\ m^2/s$ or less, $5*10\text{-}7\ m^2/s$ or less, $10\text{-}7\ m^2/s$ or less, $5*10\text{-}8\ m^2/s$ or less, or $10\text{-}8\ m^2/s$ or less, each at 20° C. In an embodiment, the carrier 10 is formed in a plurality of parts.

The thermal conductivity of the encasing 19 should be at least half an order of magnitude, and in an embodiment more than one or one and a half orders of magnitude higher than that of the carrier 10. One order of magnitude is $1*10^1$.

In a further embodiment of the sensor arrangement 1, the temperature sensor element 13 is a diode. Diodes have the advantage of a linear temperature dependency as well as a low contact current (in the μA range) and thus a low power loss and self-heating. In connection with the above-described reduction of the heat input via the carrier 10, the temperature sensor element 13 can be designed to be very sensitive, so that it can also be used for temperature measurement in gases and thereby provides the desired short response times.

The temperature sensor element 13 described can be integrated in a further sensor, for example, but not in a limiting manner, in a pressure sensor 2. FIG. 2 and FIG. 3 show two combined pressure-temperature sensors. In both, a sensor arrangement 1 according to the invention (narrow hatching) according to FIG. 1 is shown, the temperature sensor element 13 of which is arranged in a pressure port 20 of the pressure sensor 2 (wide hatching). FIG. 2 shows the pressure-temperature sensor in a perspective view with a view of a pressure channel 22 of the pressure port 20, but without a pressure transducer. FIG. 3 shows a similar pressure-temperature sensor in a sectional illustration, a pressure transducer 23 of which closes the pressure channel 22 at its end opening in a housing 21.

The pressure sensor 2 of the pressure-temperature sensor comprises, as shown in FIGS. 2 and 3, the housing 21 with the pressure port 20 and the pressure channel 22, in which a medium is present, the pressure of which is to be measured. The housing 21 is open in FIGS. 2 and 3 for a better representation of the components arranged inside.

In the embodiment shown in FIG. 3, the pressure channel 22 is closed at its first end opening in the housing 21 with a micromechanical pressure transducer 23 arranged there, so that pressure acts directly on the pressure transducer 23 through the pressure port 20 and an electrical measurement signal can be tapped from the pressure transducer 23, which allows conclusions to be drawn about the applied pressure. The second end of the pressure channel 22 is located in a lower region of the pressure port 20.

Such a pressure-temperature sensor can be used, for example, on or in a liquid tank, a delivery module or another component of a liquid tank or at another point in order to measure the pressure and temperature of a medium. In application, this is passed through an opening in a container wall, for example the wall of a tank, in a manner sealing against the medium, and opens into the medium to be measured. The described sensor arrangement 1 with a combination of temperature sensor element 13 and pressure sensor 2 can be used, for example, in a measuring arrangement which, in addition to the sensor arrangement 1, includes the wall of a container or a line in which the medium, for example its pressure and temperature, is to be measured. In such a measuring arrangement, the measuring head 26 of the sensor arrangement, which in this embodiment is formed by the temperature sensor element 13 and/or the inlet of the pressure channel 22, depending on which of the two values is to be measured individually or as a function of the other, protrudes through the wall into the volume or the volume flow of the medium.

The described variants of the design and mechanical stabilization of the electrical lines 17 of the sensor arrangement 1 support a structured design of the carrier 10, which is used to mount the temperature sensor element 13 in the pressure sensor 2 at the desired position. For example, the temperature sensor element 13 can be mounted in or on the pressure opening or in or on the pressure port 20 in order to determine the temperature state of the medium present. Other positions in relation to the pressure sensor 2 are also possible. For example, a desired distance between the temperature sensor element 13 and the pressure transducer 23 can be established by the carrier 10. Several temperature sensor elements 13 can also be arranged at different positions and/or different distances.

In the sensor arrangement 1, a temperature sensor element 13 arranged on the carrier arm 12 of the carrier 10 is combined with the pressure sensor 2 in such a way that the pressure channel 22 is not closed. The carrier plate 11 lies in the housing 21 and the carrier arm 12 runs through the pressure port 20. The temperature sensor element 13 is located outside the pressure port 20. The encasing 19 of the temperature sensor element 13 encloses the temperature sensor element 13, the second contact surfaces 16.2. and the free end of the carrier arm 12 in such a way that there is good heat transfer from the medium to the temperature sensor element 13 and the encasing 19 connects to the pressure port 20. The encasing 19 in FIG. 3 differs from that in FIG. 2 in that it has a reduced cross-section in the lower region. This brings about a further reduction in the response time of the temperature sensor element 13.

With the embodiment variants of a pressure-temperature sensor for measurement in a liquid tank shown in FIGS. 2 and 3, very short t90 response times of the temperature sensor element 13 are achieved using materials with good or poor heat conduction. These are, for example, in a liquid medium or gaseous medium exhibiting currents, in the range of a few tens of seconds to approximately 100 seconds. If there are currents in the liquid medium, less than 10 seconds can be achieved.

The thermal conductivity of the material of the encasing 19 is dimensioned in such a way that good heat conduction to the temperature sensor element 13 is guaranteed. For a short response time of the temperature sensor element 13, among other things, a high thermal conductivity and a low heat absorption capacity of the encasing 19 and good heat transfer from the encasing 19 to the temperature sensor element 13 are desirable. The encasing 19 also ensures the necessary physical and chemical protection against the medium. The choice of material, the material combination, and the design of the encasing 19 are configured according to both functions.

For the encasing 19 of the temperature sensor element 13, modified polyphenylene sulfide (PPS) was used in the embodiment. This is a thermally conductive, thermoplastic, partially crystalline plastic for mechanical, electrical, thermal and chemically highly stressed molded parts, including for electronic applications. The material enables rapid heat input from the medium into the temperature sensor element 13 through the encasing 19.

In order to reduce the heat conduction to the temperature sensor element 13 via the carrier 10, the carrier 10 has poor thermal conductivity in the measuring portion 24 and every portion directly adjoining it. The materials and/or the thermal conductivity values of the measuring portion 24 and the portions directly adjoining it can match or differ from one another, for example for thermal or procedural reasons or because of chemical or mechanical requirements. Optionally, the entire carrier 10 can consist of a material with poor thermal conductivity.

For the carrier arm 12, polybutylene terephthalate (PBT) was used, a thermoplastic material that can be processed by injection molding and that has high strength, rigidity and dimensional stability as well as good chemical resistance. The poor thermal conductivity of the carrier arm 12 reduces the heat input from the sensor itself into the temperature sensor element 13. Alternatively, other good or poor thermally conductive materials can also be used for the named components.

The connection devices 14 of the temperature sensor element 1 as described above protrude from the housing 21 and, in the embodiment shown in FIG. 3, are electrically connected to a board 31 of the pressure sensor 2, for example by wire bridges 32. The first contact surfaces 16.1 of the temperature sensor element 1 are also electrically connected to the board 31, for example via wire bridges, so that a board 31 can be used for the electronics of the temperature sensor element 1 and the electronics of the pressure sensor 2. The connection devices 14 are designed in this way as plug contacts of the pressure-temperature sensor. The board 31 can contain at least one integrated circuit which can be used for signal processing, intermediate storage, signal forwarding and, if necessary, further functions of the pressure sensor 2, memory, and further electronic components 33 required for the operation of the pressure-temperature sensor. For this purpose, the board 31 of the pressure sensor 2, which has the suitable electronic components, is connected to the temperature sensor element 13 or its electrical lines 17.

Other variants of the connection devices 14 and the electrical interconnection of the temperature sensor element 1, pressure sensor 2, and board 31, as well as more than one board are possible.

The housing 21 is closed and can have several chambers 34 that are separate from one another, as shown in FIG. 3.

The temperature sensor element 13 has a short response time, in particular a low t90 value, while meeting the respective, application-specific requirements in terms of mechanical stability during manufacture and use as well as in terms of resistance to the surrounding medium.

In the sensor arrangement 1, the temperature sensor element 13 can be combined with a further sensor, for example the pressure sensor 2, without a significant reduction in these properties.

The heat input into the temperature sensor element 13 is reduced by components of the sensor arrangement 1, with the exception of the thermally conductive encasing 19 of the temperature sensor element 13, at least for the components that are in direct thermal contact with the temperature sensor element 13, such as the electrical lines 17 and the carrier 10. By reducing the heat input via these elements, the influence of other, more distant components of the sensor arrangement 1 can also be reduced. Due to the thermal separation of the temperature sensor element 13 by the poorly heat-conducting carrier 10, the influence of the heat generated by the electronics of the temperature sensor element 13 itself and/or the pressure sensor 2 is avoided or at least significantly reduced.

In this way, there is a thermal separation of the temperature sensor element 13 from other components of the sensor arrangement 1 that are located in a more distant region or protrude into distant regions. The concept of the remote region is not associated with any minimum measure of the distance between the temperature sensor element 13 and the relevant area. It should only serve to distinguish the concept from the measuring environment, which is spatially separated for this purpose.

In contrast to this, the heat input from the surrounding medium into the temperature sensor element 13 via its encasing 19 is improved by using a material that conducts heat well.

Thermal separation can be improved through material properties and a reduction in the cross-sections of components. However, the latter affects the mechanical stability and resistance of the component in question, so that it must also be protected from undesired mechanical stress by suitable measures.

A method is specified in which the following method steps are carried out:

First, the temperature sensor element 13 is provided, the design and performance parameters of which are adapted to the respective measuring task. The carrier 10 is also provided, which is used to hold the temperature sensor element 13, as well as connection devices 14 which are used for the electrical connection of the sensor arrangement 1 to an external device. For the implementation of the temperature sensor element 13, the carrier 10 and the connection devices 14, reference is made to the statements made above on the sensor arrangement 1. Depending on its configuration, the carrier 10 can be prefabricated or manufactured as part of the production of the sensor arrangement 1.

The temperature sensor element 13 is then mounted on the carrier 10 by a suitable material-fitting, form-fitting or force-fitting connection.

Furthermore, the electrical lines 17 are formed on the carrier 10, wherein the temperature sensor element 13 does not necessarily have to be installed before the electrical lines 17 are formed on the carrier 10. A reverse sequence is also possible, provided that the installation of the temperature sensor element 13 does not damage the lines 17 and the position of the lines 17 does not hinder the installation of the temperature sensor element 13. The sequence can also depend on the method used and described in more detail below for forming the electrical lines 17.

If the temperature sensor element 13 and electrical lines 17 are arranged on the carrier 10, the connection between the temperature sensor element 13 and the connection devices 14 can be established via electrical lines 17. For this purpose, contact surfaces 16.1, 16.2 can be used which can be arranged on the temperature sensor element 13 and/or on the carrier 10, i.e. the carrier itself or a line carrier mounted thereon as described herein, and/or on the connection devices 14.

Electrical lines 17 are formed which, in order to reduce the heat input into the temperature sensor element 13 via these lines 17, have a cross-sectional area of equal to or less than 0.08 mm². To protect these thin lines 17, they are designed following the shape of the carrier 10, at least in those portions in which stress leading to damage is to be expected. In other words, the lines 17 lie in these portions on the carrier 10 or are integrated into its surface, so that the carrier 10 absorbs the stress and protects the lines 17. Optionally, the lines 17 can run freely over the carrier 10 in short portions in which, for example, the stress on the relevant line portion due to the surface design of the carrier 10 will be greater than the stress to be expected from the outside or where a distance between the carrier 10 and a contact surface for an electrical line 17 has to be overcome. The electrical lines 17, in an embodiment, run over their entire length on the carrier 10.

In a further method step, the temperature sensor element 13, optionally including the contact surfaces for electrical contacting thereof, is encased by a material with good thermal conductivity. The encasing can take place with the known methods, for example, but not restrictively, by a housing or an encapsulation or a combination of both.

The last two steps for encasing the temperature sensor element 13 and the sensor arrangement 1 do not necessarily have to be carried out in the specified order. If, for example, the temperature sensor element 13 is to be integrated in the pressure sensor 2, the previous encasing of the temperature sensor element 13 to protect it or to simplify the final assembly can also be advantageous, as can its encasing after its integration in the sensor arrangement 1. The sensor arrangement 1 can be encased using a material that differs from that of the temperature sensor element 13. For example, the thermal conductivity and heat absorption capacity of the encasing of the sensor arrangement 1 can be significantly worse in order to avoid or at least reduce the introduction of heat into the temperature sensor element 13 via this encasing 19.

This enumeration of the method steps serves to explain the invention and does not claim to be complete. Further method steps, for example to supplement required or supplementary electronics or other, can be included.

What is claimed is:

1. A sensor arrangement, comprising:
   a temperature sensor element;
   a connection device electrically connecting the sensor arrangement to an external device;
   a plurality of electrical lines electrically connecting the temperature sensor element to the connection device;
   a carrier holding the temperature sensor element and the electrical lines, the carrier having a measuring portion, the electrical lines are arranged directly on the carrier or on a separate line carrier arranged on the carrier, the electrical lines have a cross-sectional area equal to or less than 0.08 mm²; and
   an encasing enclosing the temperature sensor element.

2. The sensor arrangement of claim 1, wherein the electrical lines are formed as a circuit spatially integrated on at least one of the carrier, the separate line carrier, and an at least partially flexible printed circuit board.

3. The sensor arrangement of claim 1, wherein the electrical lines are formed as a leadframe mounted on the carrier.

4. The sensor arrangement of claim 1, further comprising a plurality of contact surfaces connecting the electrical lines to the temperature sensor element and/or to the connection device.

5. The sensor arrangement of claim 1, wherein the carrier is formed of a plastic material.

6. The sensor arrangement of claim 5, wherein the plastic material has a thermal conductivity of 5*10-6 m²/s or less, relative to 20° C., at least in the measuring portion.

7. The sensor arrangement of claim 6, wherein a thermal conductivity of the encasing is at least half an order of magnitude higher than the thermal conductivity of the plastic material.

8. The sensor arrangement of claim 1, wherein the carrier is formed in a plurality of parts.

9. The sensor arrangement of claim 1, wherein the carrier has the measuring portion at a first end and a connection portion at a second end spaced apart from the first end.

10. The sensor arrangement of claim 1, further comprising a pressure sensor.

11. The sensor arrangement of claim 10, further comprising a board having a plurality of electronic components using the temperature sensor element, the board is part of the pressure sensor.

12. The sensor arrangement of claim 10, wherein the carrier extends through a pressure channel of the pressure sensor and does not close the pressure channel.

13. The sensor arrangement of claim 12, wherein the temperature sensor element is located outside a pressure port of the pressure sensor.

14. A measuring arrangement with a wall limiting a volume or a volume flow of a medium, comprising:
   a sensor arrangement including a temperature sensor element, a connection device electrically connecting the sensor arrangement to an external device, a plurality of electrical lines electrically connecting the temperature sensor element to the connection device, a carrier holding the temperature sensor element and the electrical lines, the carrier having a measuring portion and a measuring head, and an encasing enclosing the temperature sensor element, the measuring head protrudes through the wall into the volume, the temperature sensor element has a t90 response time for a liquid medium or for a gaseous medium exhibiting currents in a range from greater than 10 seconds to approximately 100 seconds, and in the case of a liquid medium exhibiting currents in a range from one to 10 seconds.

15. A method for producing a sensor arrangement, comprising:
providing a temperature sensor element, a carrier, and a connection device electrically connecting the sensor arrangement to an external device;
assembling the temperature sensor element on the carrier;
forming a plurality of electrical lines on the carrier, the electrical lines electrically connecting the temperature sensor element to the connection device, the electrical lines have a cross-sectional area equal to or less than 0.08 mm$^2$ and at least in portions follow a shape of the carrier; and
encasing the temperature sensor element with a thermally conductive material.

16. The method of claim 15, wherein the electrical lines are formed directly on the carrier or on a separate line carrier mounted on the carrier.

17. The method of claim 16, wherein the electrical lines are formed by at least one of:
additive and subtractive laser direct structuring of the carrier for the production of line structures directly on the carrier;
two-component injection molding with the formation of the carrier as a pre-molded part and subsequently forming the electrical lines on the pre-molded part;
hot stamping the electrical lines on the carrier or on the separate line carrier;
back injection molding the carrier or the separate line carrier with the electrical lines;
forming the electrical lines on an at least partially flexible circuit board; and
production of a leadframe.

18. The method of claim 16, wherein the carrier has a plurality of contact surfaces contacting the electrical lines directly or by the separate line carrier.

* * * * *